Dec. 22, 1931. J. B. WEINTRAUB 1,837,638
MAGNIFYING GLASS FOR RADIO DIALS
Filed May 28, 1930
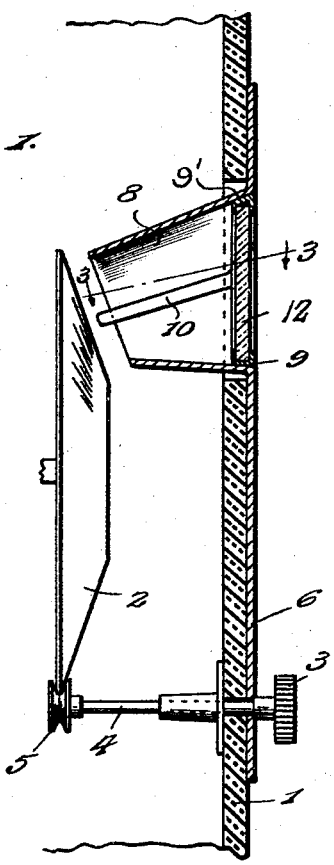
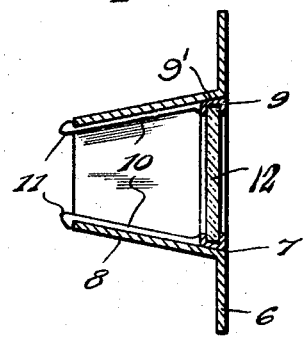
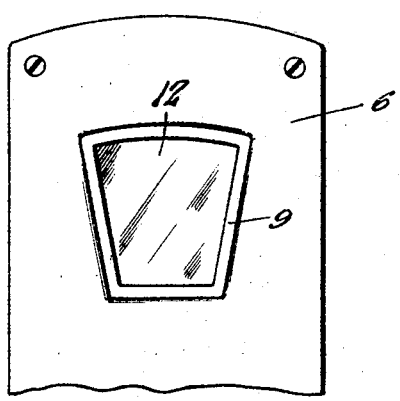
Inventor
J. B. Weintraub.
By Lacey & Lacey, Attorneys Patented Dec. 22, 1931

1,837,638

UNITED STATES PATENT OFFICE

JACOB B. WEINTRAUB, OF MIAMI, FLORIDA

MAGNIFYING GLASS FOR RADIO DIALS

Application filed May 28, 1930. Serial No. 456,621.

This invention relates to an improved magnifying glass for radio dials.

One object of the invention is to provide a device of this character which will effectually magnify the numerals on the dial face so that dial readings may be more readily taken.

Another object of the invention is to provide a magnifying glass employing clamping means for maintaining the glass in operative position.

A further object of the invention is to provide a magnifying glass which will keep dust from collecting upon the dial face.

Other and incidental objects of the invention not mentioned in the foregoing will appear during the course of the following description.

In the drawings:

Figure 1 is a fragmentary vertical sectional view showing the device in operative position.

Figure 2 is a front elevation of the device.

Figure 3 is a horizontal sectional view on the line 3—3 of Figure 1, looking in the direction indicated by the arrows.

Referring now to the drawings, the numeral 1 indicates a portion of a radio panel and associated with the panel is a dial assembly including a dial 2, a knob 3, a shaft 4, a pulley 5 on the shaft to engage the dial, and an escutcheon plate 6. By turning the knob 3, the dial 2, of course, may be rotated for tuning the radio set to select the sending station desired.

As best seen in Figure 1 of the drawings, the escutcheon plate is provided with a tapered sight opening 7 which is surrounded by the rearwardly converging walls of a downwardly inclined substantially rectangular sight tube 8 which extends more or less close to the beveled outer margin of the dial 2. It is to be understood, of course, that a drum type dial may be employed in lieu of the illustrated disc type, if preferred.

The improved magnifying glass forming the subject matter of the present invention comprises a bezel or frame 9 which is preferably formed of pressed metal and is channel shaped in cross section. As best seen in Fig. 3 of the drawings, the frame is provided with tapered edges 9'. Formed on the inner side flange of the frame midway between the top and bottom thereof are oppositely disposed resilient spring catches 10 which converge rearwardly and terminate in oppositely presented hooks 11.

Tightly clamped in the frame 9 is a relatively thick magnifying lens or pane 12, the margin of which lies in the channel of said frame.

In use, the catches 10 are inserted in the sight tube 8 and advanced rearwardly until the frame 9 wedges in the mouth of said tube when the catches 10 will spring laterally to engage the hooks 11 with the rear edges of the side walls of the tube. Thus, the frame will coact with the walls of the tube for limiting the frame against further inward movement within the tube, while the hooks will coact with the side walls of the tube for holding the frame in its wedged position within the mouth of the tube so that all looseness and vibration will be overcome. Furthermore, the frame and lens will tightly close the mouth of the tube for excluding dust and other particles from the dial face. As will be observed, the catches 10 seat flat throughout their length against the side walls of the sight tube so as to obstruct the vision through said tube as little as possible and these catches yieldably hug said side walls so as to forestall possible vibration of said catches.

What is claimed is:

1. A device of the class described including a transparency having tapered edges to wedge in converging walls of the sight opening of the escutcheon plate of a radio set, and means to operatively coact with said plate for securing the transparency in position.

2. A device of the class described including a lens, a frame mounting the lens and having tapered edges to wedge in converging walls of the sight opening of the escutcheon plate of a radio set, and means for securing the frame and lens in said opening.

3. A device of the class described including a lens, and a frame mounting the lens and having tapered edges to wedge in converging walls defining the mouth of the sight tube of an escutcheon plate of a radio set, said frame having spring catches to engage the tube for securing the frame and lens in position.

4. The combination with the dial assembly of a radio set including an escutcheon plate having a sight opening, a sight tube surrounding said opening, and a dial visible through said opening and tube, of a lens mounted in said opening at the mouth of the tube, and means engaging the inner end of said tube and securing the lens in position.

5. The combiation with a dial assembly of a radio set including an escutcheon plate having a sight opening, a sight tube surrounding said opening, and a dial visible through said opening and tube, of a lens, a frame mounting the lens and disposed in said opening, the frame being wedged in the mouth of the tube, and spring catches carried by the frame and provided with hooks engaging the inner end edge of the tube for securing the frame in its wedge position in the mouth of the tube.

6. The combination with a dial assembly having an escutcheon plate provided with a sight opening and a sight tube surrounding said sight opening, said sight tube being provided with converging walls, of a frame having tapered edges adapted to normally wedge in the mouth of the sight tube and preventing inward travel of said frame, and a lens carried by the frame.

In testimony whereof I affix my signature.

JACOB B. WEINTRAUB. [L. S.]